(12) United States Patent
Chang

(10) Patent No.: US 10,601,286 B2
(45) Date of Patent: Mar. 24, 2020

(54) MANUFACTURING METHOD FOR A MOTOR CORE

(71) Applicant: FUKUTA ELECTRIC & MACHINERY CO., LTD., Taichung (TW)

(72) Inventor: Chin Feng Chang, Taichung (TW)

(73) Assignee: FUKUTA ELECTRIC & MACHINERY CO., LTD., Taichung (TW)

( * ) Notice: Subject to any disclaimer, the term of this patent is extended or adjusted under 35 U.S.C. 154(b) by 274 days.

(21) Appl. No.: 15/622,002

(22) Filed: Jun. 13, 2017

(65) Prior Publication Data
US 2018/0358868 A1   Dec. 13, 2018

(51) Int. Cl.
| | |
|---|---|
| *H02K 15/00* | (2006.01) |
| *H02K 11/01* | (2016.01) |
| *H02K 15/03* | (2006.01) |
| *H02K 1/27* | (2006.01) |
| *C21D 8/12* | (2006.01) |
| *C22C 38/02* | (2006.01) |
| *H02K 15/02* | (2006.01) |
| *H02K 15/12* | (2006.01) |
| *H02K 1/04* | (2006.01) |
| *C09D 183/08* | (2006.01) |

(52) U.S. Cl.
CPC ........... *H02K 11/01* (2016.01); *C21D 8/1244* (2013.01); *C22C 38/02* (2013.01); *H02K 1/04* (2013.01); *H02K 1/2746* (2013.01); *H02K 15/02* (2013.01); *H02K 15/03* (2013.01); *H02K 15/12* (2013.01); *C09D 183/08* (2013.01); *Y10T 29/49009* (2015.01)

(58) Field of Classification Search
CPC ............. Y10T 29/49009; Y10T 156/10; Y10T 29/49012; Y10T 29/49078; Y10T 29/5192; Y10T 29/53143; Y10T 29/5317; H02K 15/02; H02K 1/22; H01F 41/0233
USPC ............... 29/596, 428, 598, 602.1, 604, 609
See application file for complete search history.

(56) References Cited

U.S. PATENT DOCUMENTS

| | | | |
|---|---|---|---|
| 7,041,148 B2 * | 5/2006 | Iorio ..................... | H01F 1/1475 148/104 |
| 8,709,550 B2 * | 4/2014 | Komori ................... | B05D 7/14 427/543 |
| 2009/0189471 A1 * | 7/2009 | Amano .............. | G11B 19/2009 310/156.01 |

* cited by examiner

*Primary Examiner* — Thiem D Phan
(74) *Attorney, Agent, or Firm* — Hershkovitz & Associates, PLLC; Abe Hershkovitz

(57) ABSTRACT

A manufacturing method for a motor core includes a preparing step, a coating step, a stacking step, and a forming step. In the preparing step, the silicon steel sheets are cleaned and dried. In the coating step, an electrically insulating colloid is coated between each pair of adjacent silicon steel sheets. In the stacking step, the silicon steel sheets on which the electrically insulating colloid is applied are stacked on each other to form a layered structure. In the forming step, the stacked silicon steel sheets are subjected to a colloid curing process so that the electrically insulating colloid forms a thermosetting plastic. This reduces the chance of forming eddy currents, reducing the eddy current loss of the motor core during operation.

2 Claims, 10 Drawing Sheets

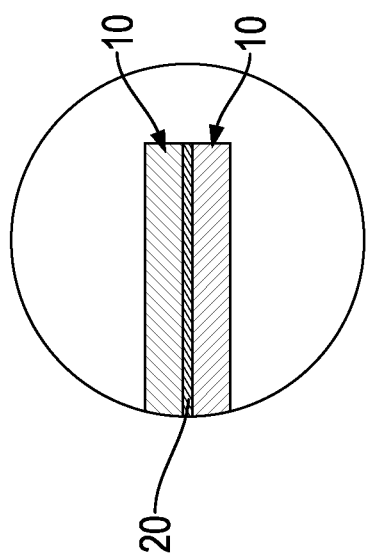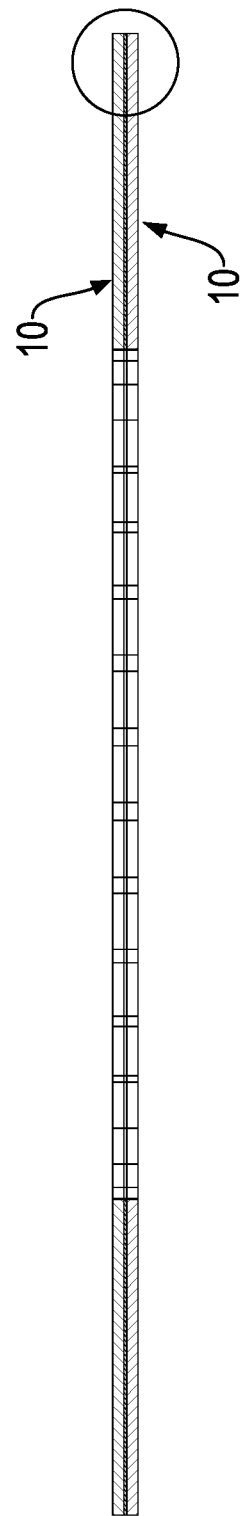

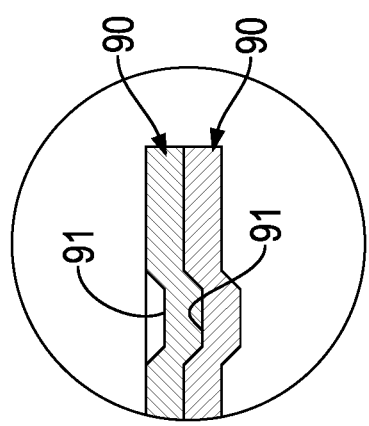
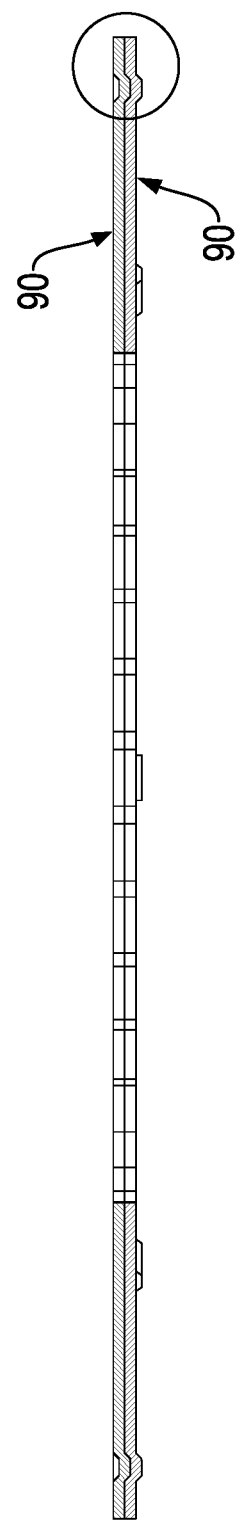
FIG. 10A
PRIOR ART
FIG. 10
PRIOR ART

MANUFACTURING METHOD FOR A MOTOR CORE

BACKGROUND OF THE INVENTION

1. Field of the Invention

The present invention relates to a manufacturing method for a motor core.

2. Description of Related Art

A motor includes a stator and a rotor, and the stator and the rotor together also can be called motor core. The stator is ring-shaped, and the rotor is cylindrical in shape. The stator and the rotor are made of a plurality of silicon steel sheets. Take the stator for example, as shown in FIG. 8 to 10A, each one of the silicon steel sheets 90 is ring-shaped. Multiple positioning portions 91 are formed in a top surface of each one of the silicon steel sheets 90 at spaced intervals. Multiple silicon steel sheets 90 are stacked with each other and are engaged with each other by the positioning portions 91, such that the motor core has a thickness.

To form a motor core, multiple silicon steel sheets 90 are stacked with each other directly in the manufacturing process, and then combined with each other by welding or bonding, etc. Therefore, the magnetic line of force may pass through the multiple silicon steel sheets 90 during the operation of the motor, which means the magnetic line of force would run in the multiple silicon steel sheets 90. However, the motor core has a magnetic resistance that will slow down the magnetic field lines, that is, hysteresis phenomenon. Hysteresis phenomenon will cause loss of current, known as hysteresis loss. In addition, during the process of the magnetic line of force running in the motor core, turning and rotation of magnetic line will occur, which is the so-called phenomenon of eddy current. Eddy current phenomenon will cause loss of current, known as the eddy current loss. The silicon steel sheets 90 are directly stacked with each other, so the magnetic hysteresis loss and eddy current loss of the situation are particularly significant, and this will cause poor efficiency of the motor output.

To overcome the shortcomings of the conventional manufacturing method of a motor core, the present invention provides a manufacturing method of a motor core to mitigate or obviate the aforementioned problems.

SUMMARY OF THE INVENTION

The main objective of the present invention is to provide a manufacturing method of a motor core. The manufacturing method of a motor core includes a preparing step, a coating step, a stacking step, and a forming step. In the preparing step, the silicon steel sheets are cleaned and dried. In the coating step, an electrically insulating colloid is coated between each pair of adjacent silicon steel sheets. In the stacking step, the silicon steel sheets on which the electrically insulating colloid is applied are stacked on each other to form a layered structure with a gap between the silicon steel sheets. In the forming step, the stacked silicon steel sheets are subjected to a colloid curing process so that the electrically insulating colloid forms a thermosetting plastic. This significantly reduces the chance of forming eddy currents, thereby drastically reducing the eddy current loss of the motor core during operation.

Other objects, advantages, and novel features of the invention will become more apparent from the following detailed description when taken in conjunction with the accompanying drawings.

BRIEF DESCRIPTION OF THE DRAWINGS

FIG. 7 is a cross sectional side view of the second embodiment of the silicon steel sheets for a motor core made by the method in FIG. 1;

FIG. 7A is an enlarged side view of the silicon steel sheets in FIG. 7;

FIG. 10 is a cross sectional side view of the conventional silicon steel sheets in FIG. 8; and FIG. 10A is an enlarged side view of the conventional silicon steel sheets in FIG. 10.

DETAILED DESCRIPTION OF PREFERRED EMBODIMENT

With reference to FIG. 1 to 4A, a first embodiment of a manufacturing method of a motor core in accordance with the present invention comprises the following steps: a preparing step S1, a coating step S2, a stacking step S3, and a forming step S4.

In the preparing Step S1, multiple silicon steel sheets 10 are cleaned and dried.

In the coating step S2, an electrically insulating colloid 20 is coated between each pair of adjacent silicon steel sheets 10, and preferably, the electrically insulating colloid 20 is arranged annularly at spaced intervals on upper and lower surfaces of each pair of adjacent silicon steel sheets 10.

In the stacking step S3, the silicon steel sheets 10 on which the electrically insulating colloid 20 is applied are stacked on each other to form a layered structure in which a gap is formed between each pair of adjacent silicon steel sheets 10.

Figure 1:
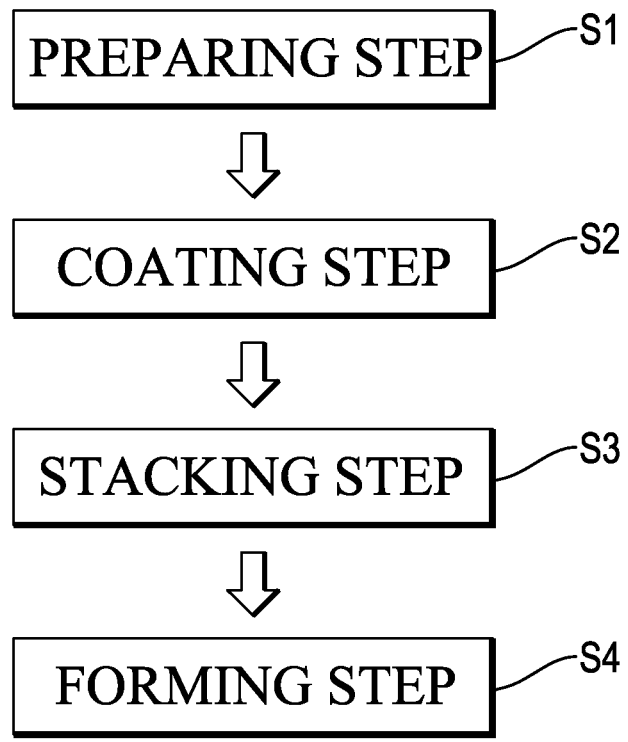
FIG. 1 is a block diagram of a method of manufacturing a motor core in accordance with the present invention.
Figure 2:
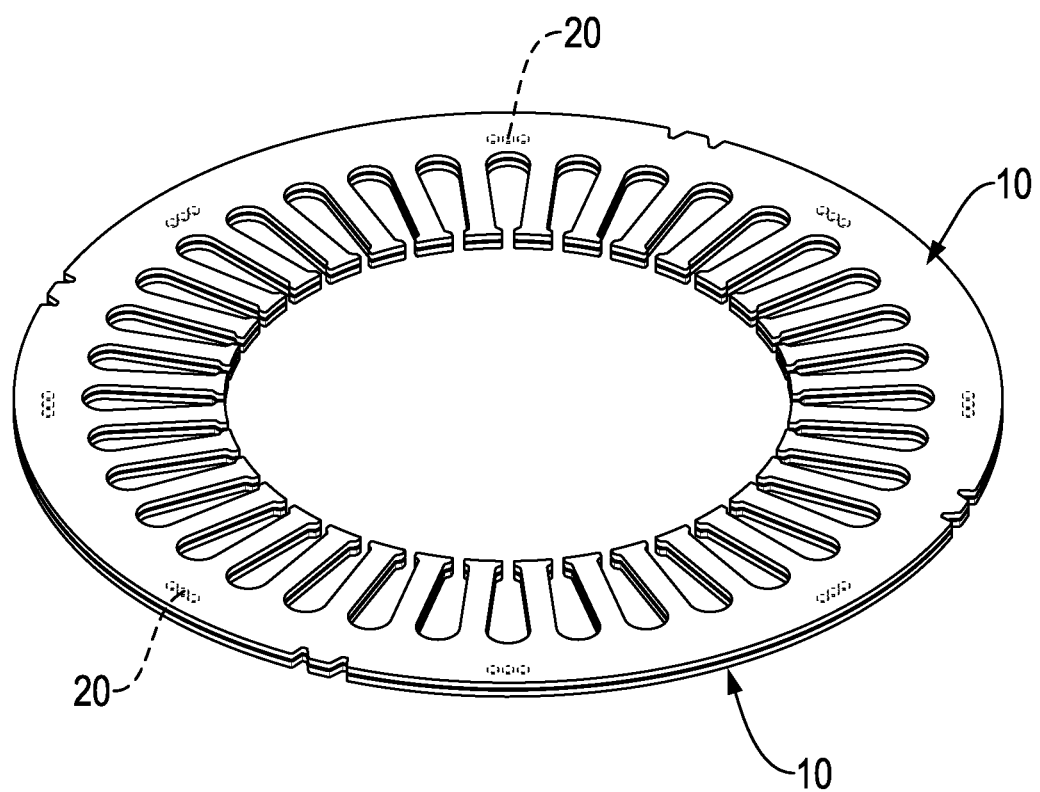
FIG. 2 is a perspective view of a first embodiment of silicon steel sheets for a motor core made by the method in FIG. 1.
Figure 3:
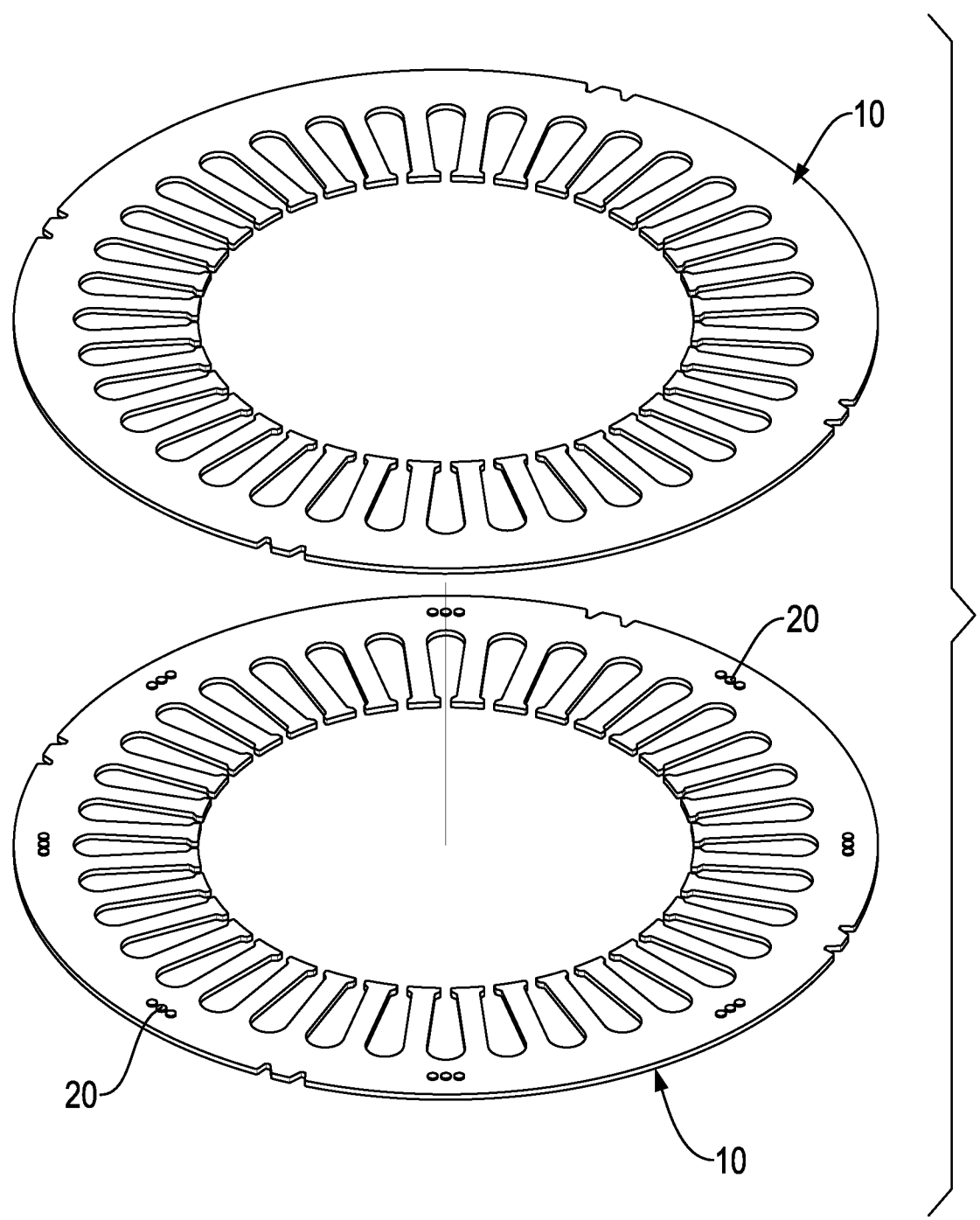
FIG. 3 is an exploded perspective view of the silicon steel sheets for the motor core made by the method in FIG. 1.
Figure 4A:
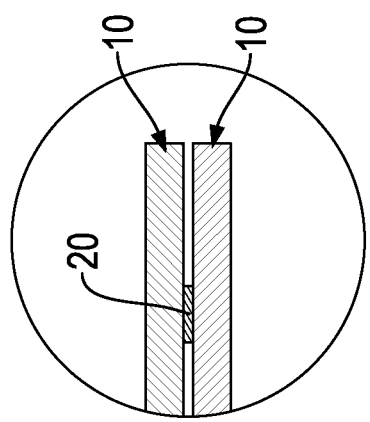
FIG. 4A is an enlarged side view of the silicon steel sheets in FIG. 4.
Figure 4:
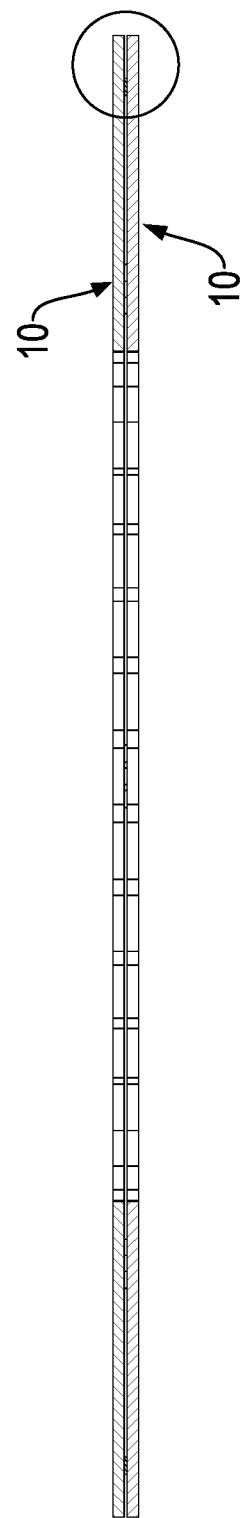
FIG. 4 is a cross sectional side view of the first embodiment of silicon steel sheets for a motor core made by the method in FIG. 1.
Figure 5:
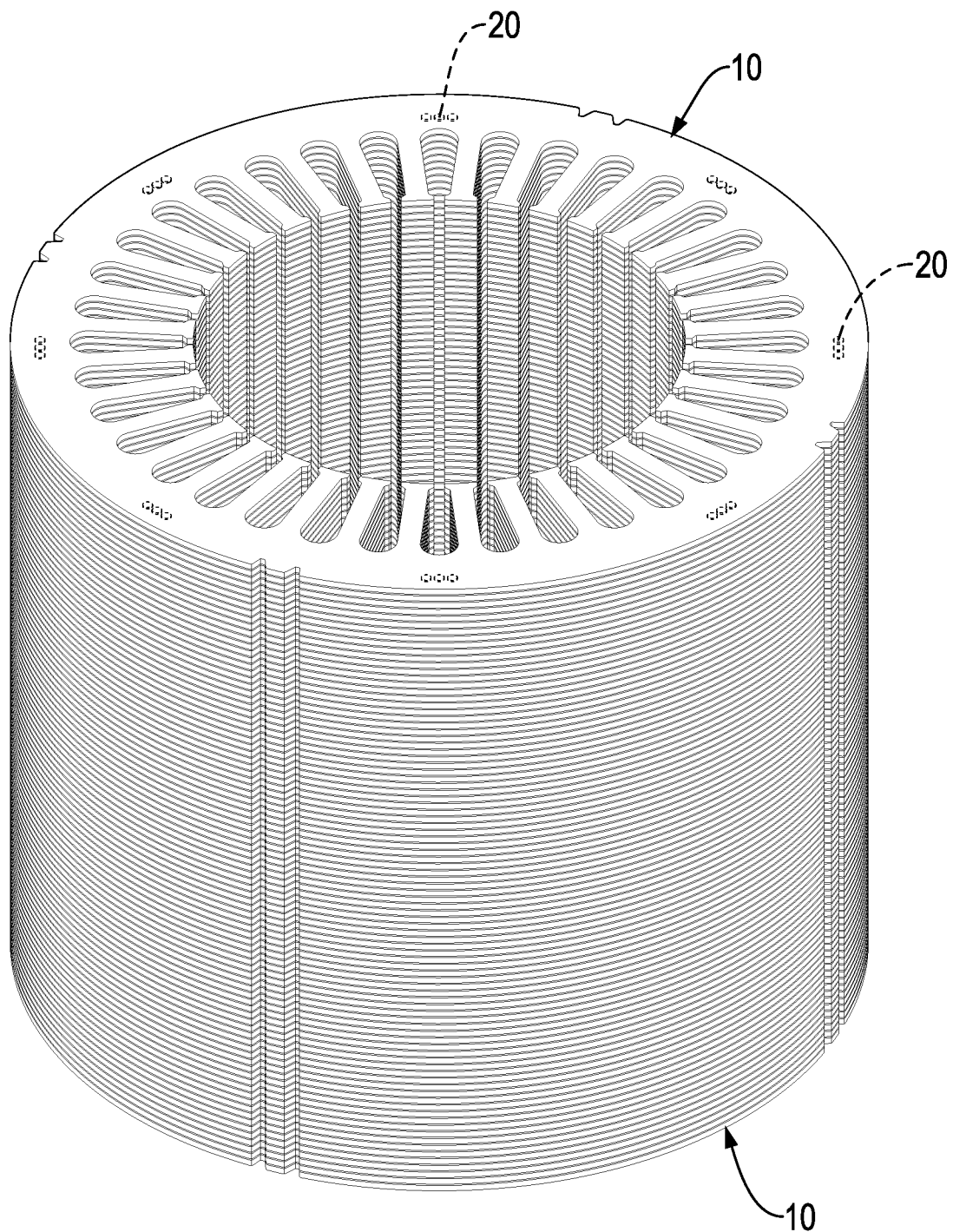
FIG. 5 is a perspective view of a first embodiment of the motor core made by the method in FIG. 1.

In the forming step S4, the stacked silicon steel sheets 10 are subjected to a colloid curing process so that the electrically insulating colloid 20 forms a thermosetting plastic, and the silicon steel sheets 10 are electrically unconnected and the finished product of a motor core is shown in FIG. 5. In addition, the colloid curing step may be a heating or anaerobic or pressurization process. The heating range of the colloid curing procedure is 100 C to 250 C when the colloid curing step is a heating step. For the pressurization program, the pressing force of the pressing process is 2000 kgf to 10000 kgf.

Figure 6:
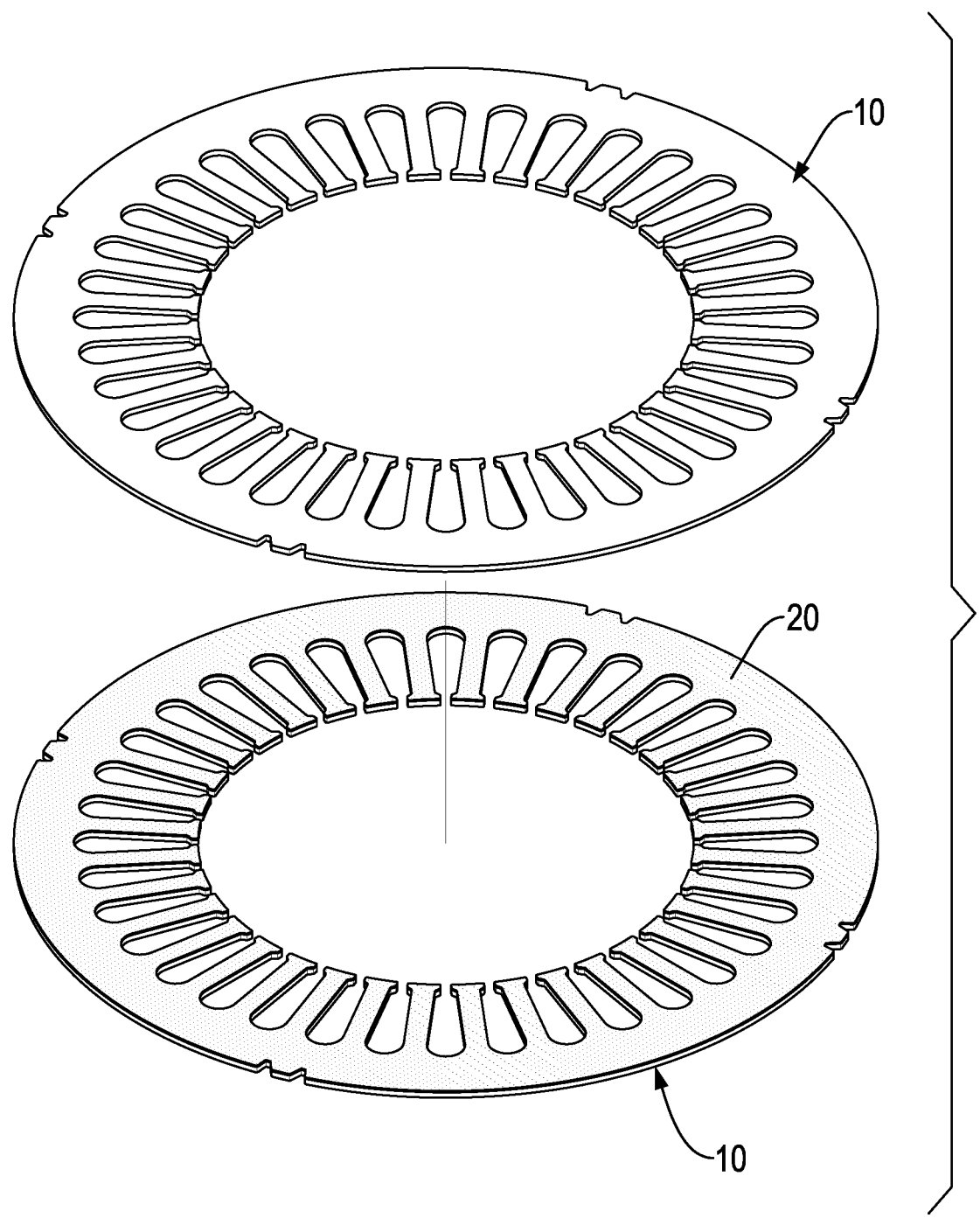
FIG. 6 is an exploded perspective view of a second embodiment of silicon steel sheets for a motor core made by the method in FIG. 1.
Figure 8:
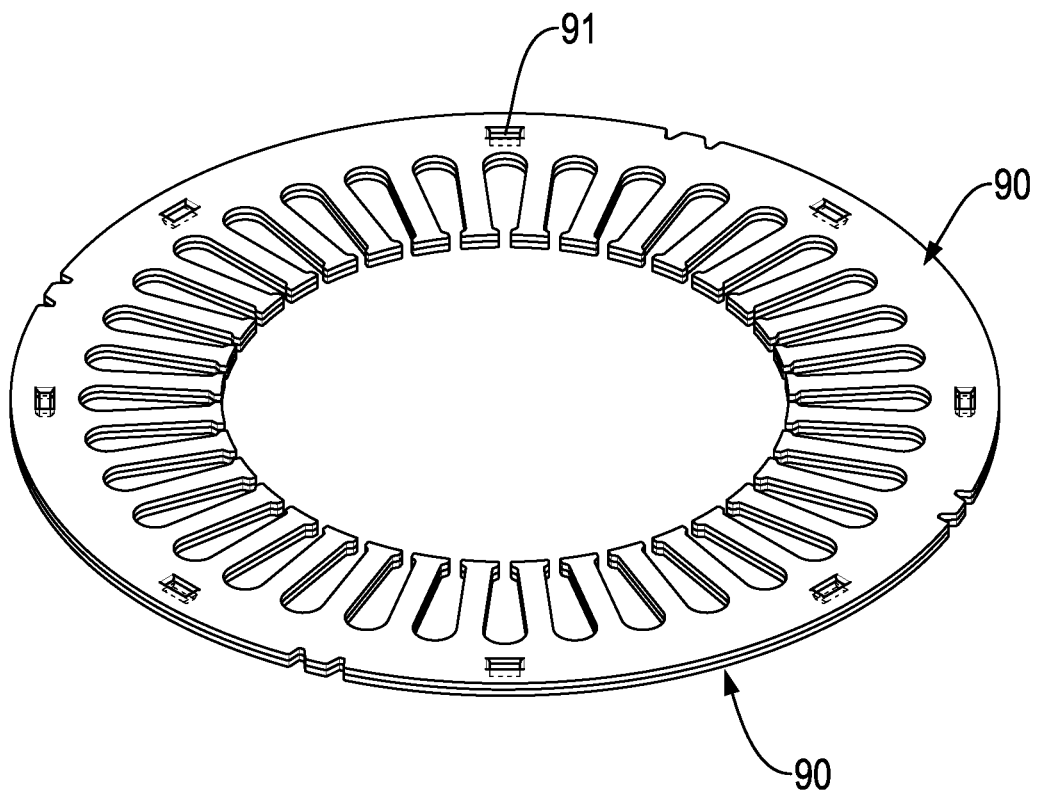
FIG. 8 is a perspective view of conventional silicon steel sheets.
Figure 9:
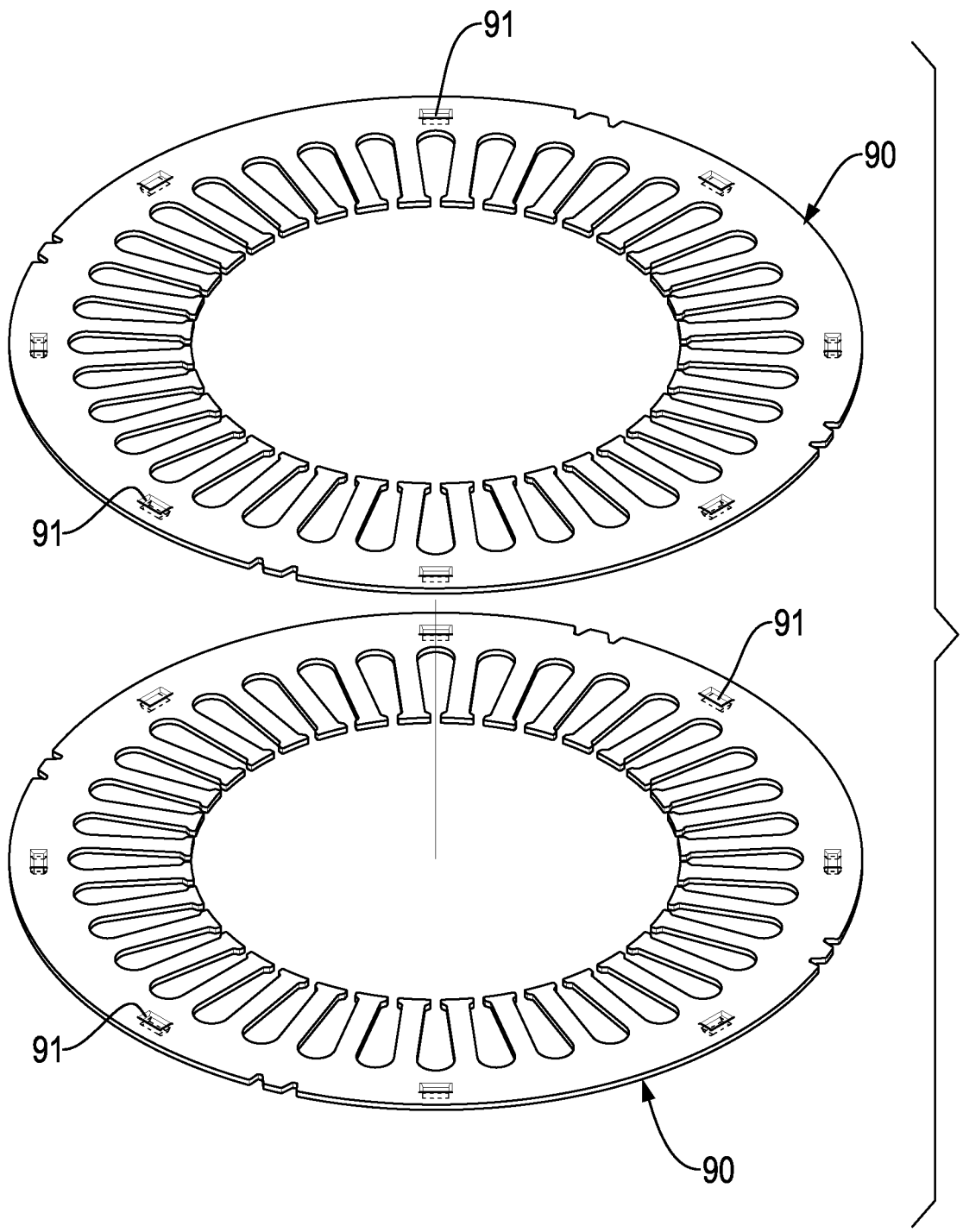
FIG. 9 is an exploded perspective view of the conventional silicon steel sheets in FIG. 8.

With reference to FIGS. 6 to 7A, a second embodiment of a manufacturing method for a motor core in accordance with the present invention is substantially the same as the first embodiment except for the following features. In the coating step S2, the electrically insulating colloid 20 is completely covered on the upper and lower surfaces of each pair of adjacent silicon steel sheets 10. In the stacking step S3, the gaps between the adjacent steel sheets 10 are filled with the electrically insulating colloid 20.

In summary, the main feature of the present invention is that the electrically insulating colloid 20 is applied on the upper and lower surfaces of each pair of adjacent silicon steel sheets 10 so that the electrically insulating colloid 20 is provided between the upper and lower surfaces of each pair of adjacent silicon steel sheets 10. The magnetic field lines cannot pass through the electrically insulating colloid 20 during the operation, so that the magnetic field lines can only run in the respective silicon steel sheets 10, and the chance of forming vortices is greatly reduced. Therefore, the present invention can significantly reduce the eddy current loss of the motor core during operation.

With reference to FIG. 2 to 4A, a first embodiment of a motor core product in accordance with the present invention comprises multiple silicon steel sheets 10 and multiple layers of electrically insulating colloid 20.

Each one of the silicon steel sheets 10 is disk-shaped, and the electrically insulating colloids 20 are arranged at intervals on the upper and lower surfaces of each pair of adjacent silicon steel sheets 10, so that a gap is formed between each pair of adjacent silicon steel sheets 10.

With reference to FIGS. 6 to 7A, a second embodiment of a motor core in accordance with the present invention is substantially the same as the first embodiment except for the following features. The multiple layers of electrically insulating colloids 20 are completely coated on the upper and lower surfaces of each pair of adjacent silicon steel sheets 10 so that an electrically insulating colloid 20 is filled in the gap between each pair of adjacent silicon steel sheets 10.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A manufacturing method for a motor core comprising:
   a preparing step, wherein multiple silicon steel sheets are cleaned and dried;
   a coating step, wherein an electrically insulating colloid is coated between each pair of adjacent silicon steel sheets;
   a stacking step, wherein the multiple silicon steel sheets coated with the electrically insulating colloids are stacked on each other to form a layered structure; and
   a forming step, wherein the stacked silicon steel sheets are applied with a colloid curing process to form the colloids to a thermosetting plastic, and the colloid curing process of the forming step is pressurization, wherein the pressing force of the pressing process is kgf to 10000 kgf.

2. The manufacturing method as claimed in claim 1, wherein in the coating step, the electrically insulating colloid is annularly arranged at spaced intervals between each pair of adjacent silicon steel sheets, and in the stacking step, a gap is formed between each pair of adjacent silicon steel sheets.

\* \* \* \* \*